US011334933B2

(12) United States Patent
Price et al.

(10) Patent No.: US 11,334,933 B2
(45) Date of Patent: May 17, 2022

(54) METHOD, SYSTEM, AND MANUFACTURE FOR INFERRING USER LIFESTYLE AND PREFERENCE INFORMATION FROM IMAGES

(71) Applicant: Palo Alto Research Center Incorporated, Palo Alto, CA (US)

(72) Inventors: Robert R. Price, Palo Alto, CA (US); Anirban Roy, Corvallis, OR (US); Hoda Eldadiry, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 184 days.

(21) Appl. No.: 15/828,037

(22) Filed: Nov. 30, 2017

(65) Prior Publication Data

US 2019/0164212 A1 May 30, 2019

(51) Int. Cl.
G06Q 30/00 (2012.01)
G06Q 30/06 (2012.01)
G06Q 30/02 (2012.01)
G05B 17/02 (2006.01)
G06F 16/50 (2019.01)

(52) U.S. Cl.
CPC ......... *G06Q 30/0631* (2013.01); *G05B 17/02* (2013.01); *G06Q 30/02* (2013.01); *G06F 16/50* (2019.01)

(58) Field of Classification Search
CPC ............... G06Q 30/0631; G06Q 30/02; G06Q 30/0601–0645; G06Q 30/08; G05B 17/02; G06F 16/50
USPC ............................................... 705/26.1–27.2
See application file for complete search history.

(56) References Cited

U.S. PATENT DOCUMENTS

| | | | |
|---|---|---|---|
| 9,384,422 B2 * | 7/2016 | Di ............................. | G06K 9/46 |
| 10,210,429 B2 * | 2/2019 | Cai ....................... | G06K 9/6256 |
| 10,360,600 B1 * | 7/2019 | Polson .................. | H04L 67/306 |
| 10,565,498 B1 * | 2/2020 | Zhiyanov ............... | G06N 7/005 |

(Continued)

FOREIGN PATENT DOCUMENTS

| | | | | |
|---|---|---|---|---|
| KR | 2007-0119105 A | * | 12/2007 | ............... G06K 9/78 |
| WO | 2017142361 A1 | | 8/2017 | |

OTHER PUBLICATIONS

Lisa Tagliaferri, "An Introduction to Machine Learning", Sep. 28, 2017, DigitalOcean (Year: 2017).*

(Continued)

*Primary Examiner* — Jeffrey A. Smith
*Assistant Examiner* — Lindsey B Smith
(74) *Attorney, Agent, or Firm* — Womble Bond Dickinson (US) LLP

(57) ABSTRACT

A method of monitoring user interactions with a networked device includes receiving image data associated with one or more images of a user, computing a plurality of visual features of the one or more images from the image data, and calculating, by a processing device, a style characteristic from the plurality of visual features. The method include calculating, by the processing device, a lifestyle characteristic based on the style characteristic and calculating, by the processing device, a user preference based on the lifestyle characteristic. The method includes determining a recommendation of a product based on the user preference and providing the recommendation to a user device associated with the user.

16 Claims, 8 Drawing Sheets

(56) References Cited

U.S. PATENT DOCUMENTS

2015/0199771 A1\* 7/2015 Balinski .............. G06F 16/9535
   705/319
2016/0189274 A1\* 6/2016 MacLaurin ........ G06Q 30/0631
   705/26.7
2017/0193533 A1\* 7/2017 Lai ..................... G06Q 30/0202

OTHER PUBLICATIONS

Extended European Search Report dated Mar. 26, 2019 for European Patent Application No. 18209023.3.

\* cited by examiner

METHOD, SYSTEM, AND MANUFACTURE FOR INFERRING USER LIFESTYLE AND PREFERENCE INFORMATION FROM IMAGES

TECHNICAL FIELD

Implementations of the present disclosure relate to inferring user lifestyle and preference information from images.

BACKGROUND

A situation may arise in which a person who desires to make a decision about products that have an experiential component to their utility, but the person is not able to directly experience the product. Determining a suitable product in such a situation can be difficult due to the lack of experience with the product. A consumer faced with such a dilemma may resort to trial and error, which may be a frustrating and time consuming process.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In some embodiments, to aid users in selecting a product with little or no experience with various versions of the product (e.g., to aid a user to select a scent, a flavor for a food product device, music for a music device, etc.), a user may upload, or otherwise transmit an image of the interior of their home to a recommendation system. The image may be used by the recommendation system to recommend a product that the user might enjoy.

In one embodiment, to aid in product selection, processing logic of the recommendation system may exploit correlations in personality preferences across modalities. For example, if a person likes bright strident interior designs, perhaps they will like strident products as well.

As described herein in various embodiments, processing logic of the recommendation system may receive image data associated with the one or more images of the user. In one embodiment, the user may upload one or more images to the recommendation system. Processing logic may then compute a number of visual characteristics (e.g., also referred to herein as "features") of the one or more images from the image data. Visual characteristics may include, for example, furnishings, décor, size, color, etc. Processing logic may calculate, by a processing device, a style characteristic from the number of visual features. For example, processing logic may determine that an image represents a "country" style room, based on the features.

Processing logic may also calculate, by the processing device, a lifestyle characteristic based on the style characteristic. In one embodiment, lifestyle characteristics may include characteristics such as, "messy," "clean," "affluent," "pet owner," and the like. Processing logic may calculate, by the processing device, a user preference based on the lifestyle characteristic. The user preference may be associated with a particular product. Processing logic may determine a recommendation of a product (e.g., a particular scent, flavor, etc.) based on the user preference and provide the recommendation to a user device associated with the user. During training, processing logic may train a model to predict a variety of possible lifestyle characteristics. Processing logic may train a second model to map these characteristics to preferences over options available in the product category of interest. In one embodiment, training data for the second model may be received from consumer satisfaction models.

In some embodiments, the networked device, the systems, articles of manufacture, and methods described herein are equally applicable to any good (e.g., product) with an experiential component (e.g., one that cannot be easily described by typical media available online to consumers), such as images, text, video, audio etc. Furthermore, although "networked device" is used herein, the systems, articles of manufacture, and methods described herein are equally applicable to any non-networked device as well.

Figure 1:
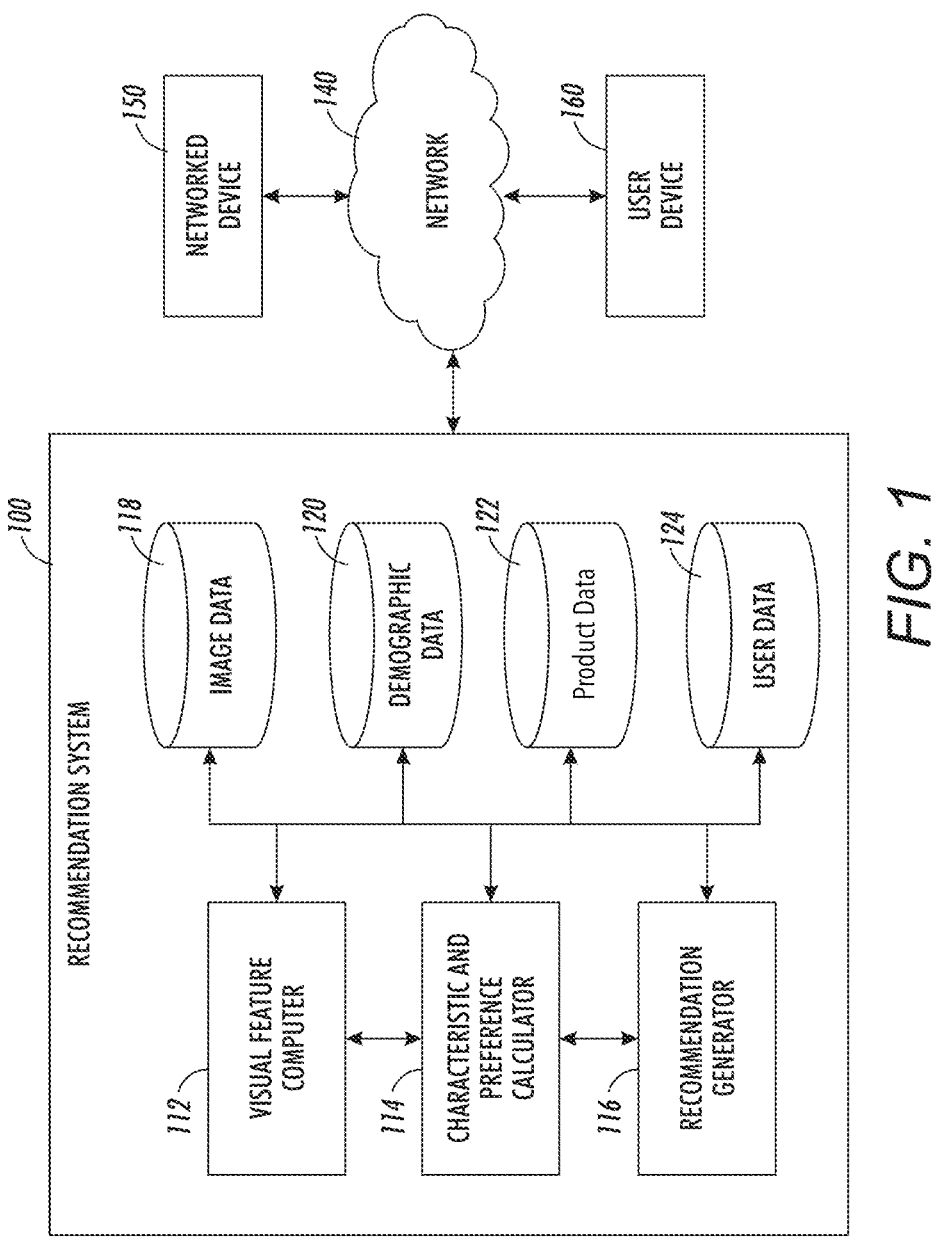
FIG. 1 is a schematic diagram of an embodiment of recommendation system, which can be used in accordance with some embodiments.

FIG. 1 is a diagram showing a recommendation system 100 for use with implementations of the present disclosure. Although specific components are disclosed in recommendation system 100, it should be appreciated that such components are examples. That is, embodiments of the present invention are well suited to having various other components or variations of the components recited in recommendation system 100. It is appreciated that the components in recommendation system 100 may operate with other components than those presented, and that not all of the components of recommendation system 100 may be required to achieve the goals of recommendation system 100.

In FIG. 1, a recommendation system 100 may receive image data 118 associated with one or more images of a user. The image data 118 may be the logical representation of the one or more images. In one embodiment, two images are received by processing logic, where each image is of (depicts, shows, etc.) a different interior room associated with a user. In another embodiment, a single image or multiple images of the same interior room is/are received. Image data may be stored in a data store in the recommendation system.

Visual feature computer 112 of recommendation system 100 computes a plurality of visual features of the one or more images from the image data 118. In one embodiment, visual features of the one or more images may be visible objects in the one or more images. For example, furniture, pets, cars, food, electronics, paint colors, floor styles, etc. may be visual features computed by the visual feature computer 112. The visual feature computer 112 may utilize computer vision, object recognition, machine learning, and other techniques to compute the visual features. In one embodiment, if the number of computed visual features is below a defined threshold, an error message indicating that the image may not be used may be sent to a computing device (e.g., a user device 160 associated with an uploading user).

In some embodiments, the user device 160 may be a smart home hub, a mobile device such as a smart phone or tablet, a computer, or another type of device. The user device 160 may include an application specific to the control of the networked device 150, or the user device 160 may control the operation of the networked device 150 over a web browser or other application. In some embodiments, there may be multiple user devices 160 that can each control at least a portion of the features, configurations, or settings of the networked device 150.

Characteristic and preference calculator 114 may calculate a style characteristic from the plurality of visual features computed by the visual feature computer 112. The style characteristic (also referred to herein as an indoor style of a mid-level representation) may include a style of room, as described herein. Characteristic and preference calculator 114 may calculate a lifestyle characteristic (also referred to herein as a sentiment of a mid-level representation) based on the style characteristic. In one embodiment, characteristic and preference calculator 114 identifies objects in the pictures that suggest a particular lifestyle.

Characteristic and preference calculator 114 may calculate a user preference based on the lifestyle characteristic (e.g., and the style characteristic). Characteristic and preference calculator 114 may then determine a recommendation of a product based on the user preference and provide the recommendation to a user device 160 associated with the user. In one embodiment, the recommendation may be based on past user feedback, similarity characteristics between various products, or similarity characteristics between demographic characteristics (e.g., demographic data 120) of multiple users. In one embodiment the recommendation is for a scent (selected from available product data 122). User data 124 (e.g., user preferences, prior purchase history, etc.) may be stored in recommendation system 100 for future use.

In one embodiment, another mechanism by which information may be provided to the system is to look at the correlation between visual features extracted from images or video and information formally requested from consumers. In one embodiment, personality tests may be provided to a representative sample to obtain consumer profiles and then learn to predict profiles from visual features. Processing logic may then associate psychological profiles with product preferences. In another embodiment, processing logic may directly model the relationship between visual features and product preferences using a variety of classifiers.

In some embodiments, the individual components of recommendation system 100 may be operatively communicatively coupled to one another. For example, the components may provide data to each other. In addition the data stores 118, 120, 122, and 124 may be communicatively or operatively coupled to the other components of recommendation system 100. In various embodiments, the components of the recommendation system 100 may be operatively or communicatively coupled to network device 150 and user device 160 via a network 140. In various embodiments, the components of the recommendation system 100 may be operatively or communicatively coupled in other ways than as shown in FIG. 1.

Figure 2A:
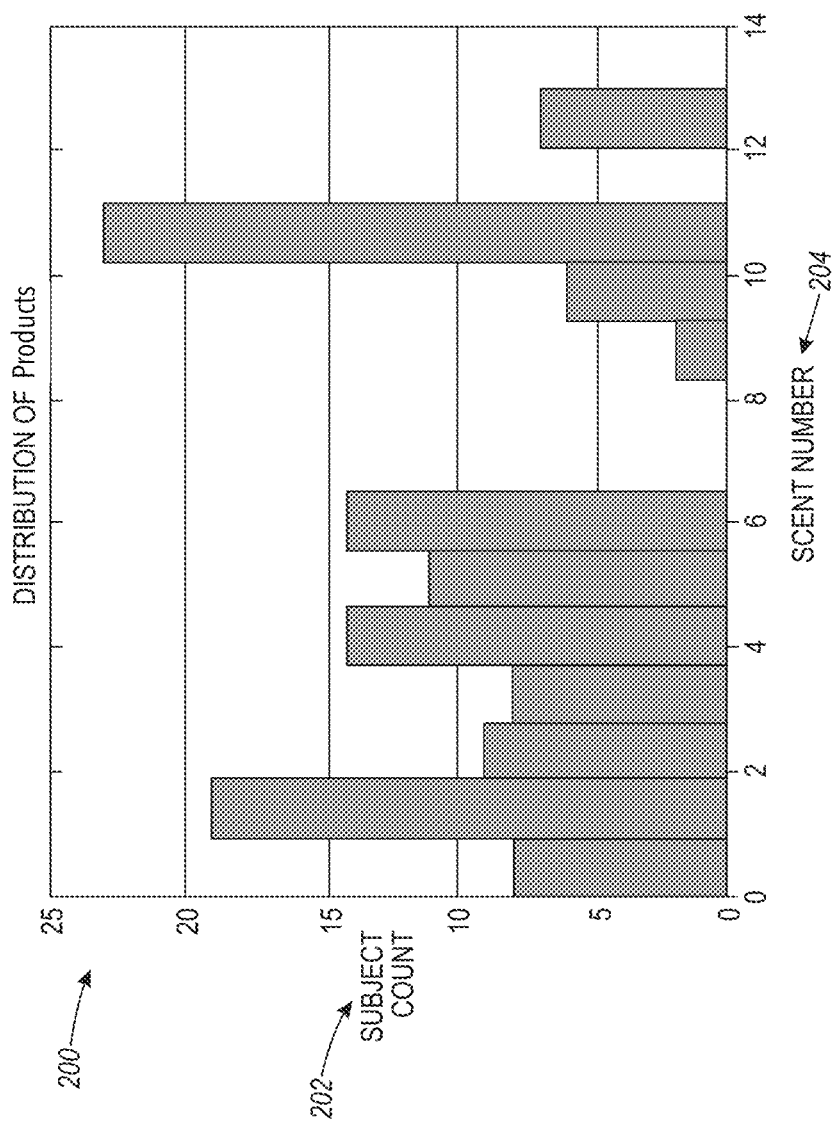
FIG. 2A is a graphical diagram showing an example distribution of products in a sample population with some embodiments.

FIG. 2A is a graphical diagram 200 showing an example distribution of products in a sample population with some embodiments. As shown, consumer satisfaction data may be analyzed to determine how many customers (e.g., 202) enjoy each of the sampled products (e.g., 204). In one embodiment, FIG. 2A demonstrates a portion of the diagnostics used to determine data quality. Processing logic may ensure sufficient samples are available from every product in order to build a reliable model.

In one example, there may be 121 subjects who return surveys (of which 113 provided product data). The subjects were spread out over a variety of different products (e.g., 1-14). In this example, product number 0 may be used to indicate that no product was reported by the subject. Popular products may include product number 1 and product number 11. In this example, users rated the product they received with their device on a five point scale from 1 (strongly disagree to 5 (strongly agree) in response to the prompt, "You like the product you selected." The distribution of product ratings is captured in FIG. 2B.

Figure 2B:
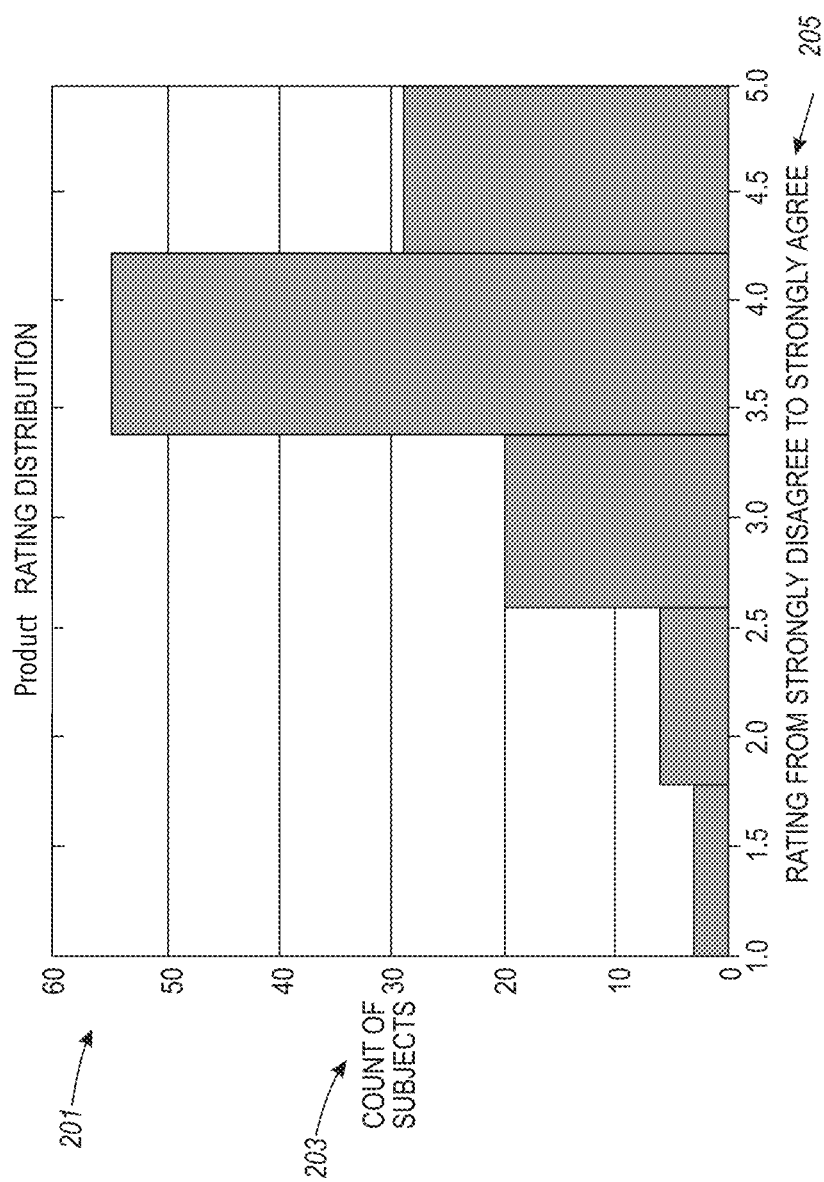
FIG. 2B is a graphical diagram showing an example product rating distribution with some embodiments.

FIG. 2B is a graphical diagram 201 showing an example product rating distribution with some embodiments. In this example, almost two thirds of respondents 203 rated their product "4" (e.g., 203). One inference that may be made from this is that most people were generally positive about the products they received. In one embodiment, this suggests that it is not that hard to estimate a user's rating. For example, the average product rating was 3.8938. Using 3.8938 as the mean to predict a rating for all subjects, the mean average error in such a rating may be: 0.6712, or less than a single rating point. Embodiments of the present disclosure may increase the accuracy and reliability (e.g., by decreasing the mean average error) over the above estimate.

In one embodiment, information may be received from users of a networked or non-networked device. The following table 1 represents some, but not all of the types of information that may be received.

TABLE 1

Feature Groups

| Feature Group | Specific Features within the Group |
|---|---|
| Subject demographic features | 'Age' 'Gender' 'Home_ownership' 'Children count' 'Adult count' 'Kids' 'Pets' 'College enrolment' 'Employment' 'Work experience' 'Salary' |
| The type of room the device occupies | 'Open' 'Cluttered' 'Cozy' 'ecclectic' 'bright' 'colorful' 'energetic' 'sophisticated' 'classy' 'practical' |
| Subject's overall ratings of the device | 'avg. satisfaction' 'avg app satisfaction' 'freshness' 'recommendation' 'use_frequently' 'product_rating' |

In one embodiment, the above information may be used to make better predictions of subject product (e.g., product) ratings.

In one embodiment, a variety of methods may be used to predict a rating from characteristics associated with the user and the products. Some (but not necessarily all) of the methods and results are summarized in the Table 2. Additional descriptions of Table 2 appear in the following subsections.

TABLE 2

Prediction Methods and Accuracy

| Method | Mean rating error |
|---|---|
| Naïve prediction using population mean | 0.6712 |
| Ordinal logistic regression on demographic, room and satisfaction features | 0.1323 |
| Ordinal logistic regression on demographic and room features only | 0.1157 |
| Hybrid Nearest Neighbor Recommendation using all features and product features (2 neighbors) | 0.2105 |

In one embodiment, leave-one-out cross validation may be utilized to evaluate the quality of a model. A user's rating of a first product may be predicted based on a particular product they have selected. One may think of this as a generic propensity to like or dislike products. This analysis may provide information about the kind of people who like various types of products. In one embodiment, for each subject the row corresponding to the subject may be removed from the population dataset. The model may be fit to the remaining rows to build a predictor for ratings. This predictor may be used to predict the withheld user's rating. The rating predicted by the model may be compared to the actual rating for the user in the survey data. The numerical difference between the predicted and actual rating may be the rating error. The process may be repeated for each subject (building X number of separate models) and the mean absolute error in ratings may be computed (e.g., see Table 2).

For multinomial regression, for example, the 'mnrfit' command may be used from the Matlab statistics and machine learning toolbox. Since the ratings have an ordinal relationship (e.g., 3 and 4 are close but 1 and 5 are far apart), the ordinal option may be used to fit the model. The 'mnrval' function may be used to predict a rating distribution from new attributes not in the fit.

In one embodiment, three feature groups (e.g., including the background demographic, room type, and feedback features) may be used to predict a product rating. An average rating error of 0.1323 rating points may be computed, which significantly reduces the error below the naïve population average prediction of 0.6712 rating points error described above.

Any number of features may be used for various users. For example, running the model operations with only background demographic and room features may result in a lower average rating error of 0.1157. To understand the computational weights of the various features a p-value analysis of logistic regression feature coefficients may be performed. The p-value may provide the probability that the coefficient could be zero given the visible data. The p-values are summarized in

TABLE 1

Table 1 - Predictor Attributes sorted by p-values

| ATTRIBUTE | P-VALUE |
|---|---|
| 'energetic' | 0.00146438255696481 |
| 'sophisticated' | 0.00797614094424961 |
| 'b4' | 0.0134759999668638 |
| 'Adult count' | 0.0137575116388638 |
| 'Home_ownership' | 0.0230022824198075 |
| 'colorful' | 0.0241912660023425 |
| 'classy' | 0.0265788724278905 |
| 'Employment' | 0.0308215270918240 |
| 'Salary' | 0.0538143026184079 |
| 'b3' | 0.0898907331845198 |
| 'avg app satisfact.' | 0.122816408929116 |
| 'Open' | 0.151372786783238 |
| 'b2' | 0.217792620866750 |
| 'Clutter' | 0.228496515763177 |
| 'Children count' | 0.263050791400153 |
| 'practical' | 0.294545643018503 |
| 'product_rating' | 0.321985370908988 |
| 'Kids' | 0.327051651616945 |
| 'Work experience' | 0.336639598098222 |
| 'b1' | 0.350326844156465 |
| 'ecclectic' | 0.351304530865395 |
| 'room style' | 0.351380898489111 |
| 'College enrolment' | 0.454285420734941 |
| 'Gender' | 0.492693021629077 |
| 'room reflects style' | 0.529138176937231 |
| 'avg. satisfaction' | 0.570438047038208 |
| 'Age' | 0.571058060790846 |
| 'use_frequently' | 0.666824697473616 |
| 'Pets' | 0.780530771463029 |
| 'Cozy' | 0.829573328157614 |
| 'recommendation' | 0.856406517476440 |
| 'freshness' | 0.857257455966614 |
| 'bright' | 0.926824566080128 |

In one embodiment, the last attribute, "bright," has a p-value of ~0.9 indicating that it is highly likely to be zero given the data. The first attribute, "energetic," has a p-value of ~0.001 indicating it is highly unlikely to be zero, so this attribute is highly likely to be playing a role in the model.

In one embodiment, P-value analysis may demonstrate how reliable an effect is, but not its magnitude. The second aspect of the analysis may involve the magnitude of the coefficients of the attributes. Analysis of the magnitudes may describe whether the influence on ratings is positive or negative and the relative magnitude of the attribute's effect on ratings. In one example, the coefficients are summarized in

TABLE 2

Table 2 - Regression Coefficients for Prediction Attributes

| ATTRIBUTE | COEFFICIENT | P-VALUE |
|---|---|---|
| 'energetic' | −1.3118 | 0.0014644 |
| 'Home_ownership' | −1.1123 | 0.023002 |
| 'Adult count' | −1.0808 | 0.013758 |
| 'classy' | −0.88277 | 0.026579 |
| 'Kids' | −0.82724 | 0.32705 |
| 'avg app satisfaction' | −0.772 | 0.12282 |
| 'Employment' | −0.62061 | 0.030822 |
| 'product_rating' | −0.44139 | 0.32199 |
| 'avg. satisfaction' | −0.31596 | 0.57044 |
| 'Clutter' | −0.31371 | 0.2285 |
| 'Work experience' | −0.20455 | 0.33664 |
| 'Salary' | −0.20043 | 0.053814 |
| 'use_frequently' | −0.1676 | 0.66682 |
| 'recommendation' | −0.026705 | 0.85641 |
| 'Age' | −0.022487 | 0.57106 |
| 'bright' | −0.010363 | 0.92682 |
| 'Cozy' | 0.057967 | 0.82957 |
| 'freshness' | 0.12227 | 0.85726 |
| 'room style' | 0.12603 | 0.35138 |
| 'Pets' | 0.14631 | 0.78053 |
| 'room reflects style' | 0.21552 | 0.52914 |
| 'ecclectic' | 0.25795 | 0.3513 |
| 'practical' | 0.36702 | 0.29455 |
| 'Open' | 0.3846 | 0.15137 |
| 'Children count' | 0.44151 | 0.26305 |

TABLE 2-continued

Table 2 - Regression Coefficients for Prediction Attributes

| ATTRIBUTE | COEFFICIENT | P-VALUE |
|---|---|---|
| 'College enrolment' | 0.5194 | 0.45429 |
| 'Gender' | 0.57137 | 0.49269 |
| 'colorful' | 0.69799 | 0.024191 |
| 'sophisticated' | 1.1574 | 0.0079761 |
| 'b1' | 3.5502 | 0.35033 |
| 'b2' | 4.6664 | 0.21779 |
| 'b3' | 6.4638 | 0.089891 |
| 'b4' | 9.6677 | 0.013476 |

A subset of factors which are both significant and have large effects are shown in

TABLE 3

Table 3 Factors with large effects

| ATTRIBUTE | COEFFICIENT | P-VALUE |
|---|---|---|
| 'energetic' | −1.3118 | 0.0014644 |
| 'Home_ownership' | −1.1123 | 0.023002 |
| 'Adult count' | −1.0808 | 0.013758 |
| 'classy' | −0.88277 | 0.026579 |
| 'colorful' | 0.69799 | 0.024191 |
| 'sophisticated' | 1.1574 | 0.0079761 |
| 'b3' | 6.4638 | 0.089891 |
| 'b4' | 9.6677 | 0.013476 |

Figure 3:
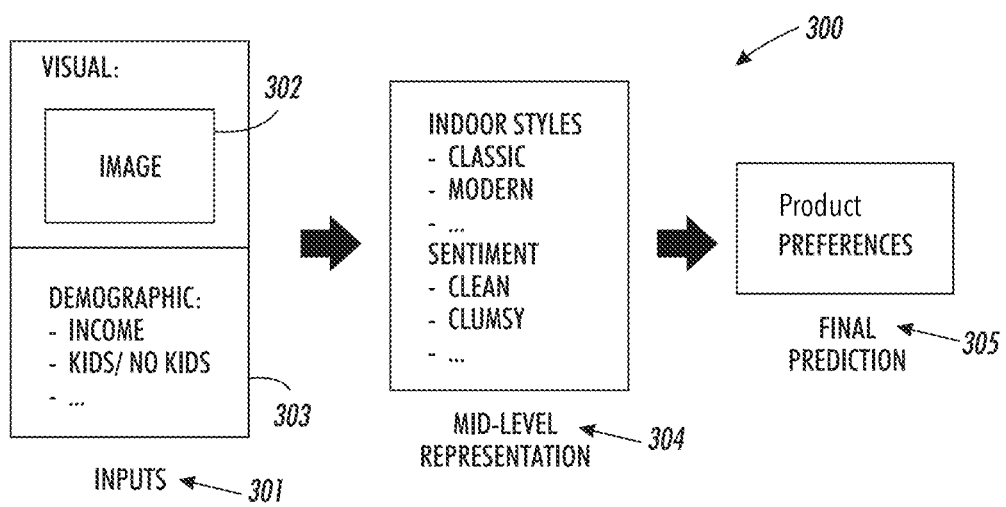
FIG. 3 is a graphical flow diagram showing a method of inferring user lifestyle and preference information from images in accordance with some embodiments.

Worth noting is that many of these factors relate to style rather than traditional demographic factors. Interestingly, home ownership and the number of adults in the household may be negatively correlated with product ratings FIG. 3 is a graphical flow diagram 300 showing a method of inferring user lifestyle and preference information from images in accordance with some embodiments. For example, the processes described with reference to FIG. 3 may be performed by processing logic of a recommendation system 100 as described with reference to FIG. 1.

In one embodiment, demographic information can be passed straight through to a preference fitting model. Demographic information may not be represented in some intermediate representation. At block 301, data may be received by processing logic (e.g., to recommender system 100 of FIG. 1). Data may be submitted by a user, retrieved from an external database or server, and/or local database or server. In one embodiment, data may be various types. In various embodiments, data may be an image 302 associated with the user. For example, an image 302 depicting an internal room associated with a user may be uploaded and received by processing logic for use in recommending a product to a user. Images may depict (e.g., show) a family room, living room, bedroom, dining room, kitchen, or bathroom, for example. In another embodiment, the image may show an outdoor space (e.g., a back yard/patio or front yard/porch) associated with the user. In another embodiment, images may include subjects other than rooms. For example, images may include objects (e.g., porcelain figures, musical instruments, bicycles, etc.).

In another embodiment, demographic data 303 may be received by processing logic at block 301. Demographic data 303 may include, but is not limited to, data associated with in income, family status (e.g., married/single, number of children, etc.), age, gender, address, pet ownership, etc. Demographic data 303 may be received from a server or database external to the immediate recommender system. In another embodiment, the demographic data 303 may be received from a server or database local to the system.

At block 304, processing logic may generate a mid-level representation of the user from the data received at block 301. In one embodiment, a mid-level representation may be an indoor style (e.g., classic, modern, contemporary, country, urban/industrial etc.) associated with and determined from a received image (e.g., image 302). In another embodiment, a mid-level representation may be a sentiment (e.g., clean, cluttered, etc.) associated with and determined from a received image (e.g., image 302). In one embodiment, machine learning frameworks such as support vector machines (SVM), random forest, and deep learning (deep neural networks) may be used to generate the mid-level representation from one image or a set of images.

In the current embodiment, two or more levels may exists. First, traditional low-level features may be applied to image pixels. These include operations such as SIFT, SURF, HOG. Then an SVM may be applied to these features to generate high level semantic classes, such as those detailed above. In one embodiment, machine learning may be used to generate a mid-level representation from the received demographic data instead or in combination with any received images.

At block 305, a final prediction (e.g., a product recommendation) is generated based on the mid-level representation. In one embodiment, the final prediction is a product prediction (e.g., recommendation) associated with networked device. In another embodiment, the final prediction is a set of products (e.g., similar products) or a networked device itself. The final prediction may be based on product preference, product rating, product review, product pricing, application review, etc. The final prediction may be used to better understand user preference, recommend products, automatically adjust product settings (e.g., of a networked device), provide proactive support, etc. Additional description of the operations of FIG. 3 is provided with respect to FIGS. 4-6.

Figure 4:
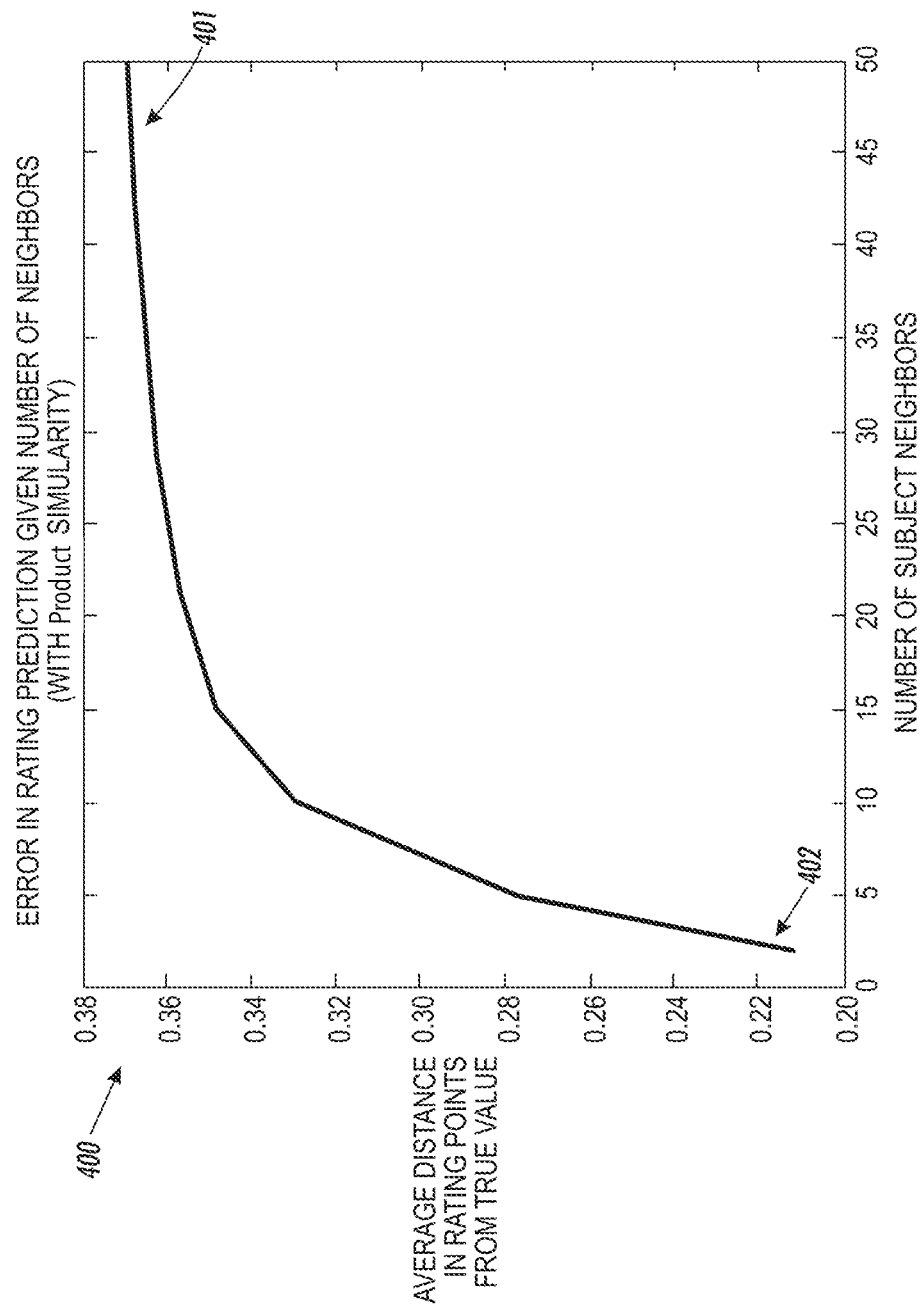
FIG. 4 is a graphical diagram showing an example error as a function of model hyper parameter in accordance with some embodiments.

FIG. 4 is a graphical diagram 400 showing an example error as a function of model hyper parameter in accordance with some embodiments. In one embodiment, the product recommendation operations described herein may utilize information about a consumer to make a recommendation of products they might like. In one embodiment, collaborative filtering may be used to make the recommendation. Collaborative filtering may include recommendation based on "people who have purchased similar things also like X," for example. In one embodiment, collaborative filtering may not be advantageous when recommending products to new users who haven't yet established a purchase history. Advantageously, an attribute-based recommendation framework, as described herein, may be used in such situations. An attribute-based recommendation system may use properties associated with the consumer and the products to perform recommendation operations instead of or in conjunction with leveraging past purchases.

In one embodiment, a hybrid form of nearest neighbor regression may be used to provide recommendations. In nearest neighbor models, the attributes of a consumer (e.g., for whom a product it to be predicted) may be compared with attributes of consumers previously seen in a population to find similar neighbors. An average of their product ratings may be computed to form a prediction for the new consumer. If too few neighbors are used, the results may have high variance. If too many neighbors are used, blurring of distinct subpopulations may occur, possibly resulting in lower accuracy (e.g., 401).

In one embodiment, when the attributes of nearest neighbors have been collected, the products associated with those neighbors may be determined. In a large data set, large neighborhoods may demonstrate examples of many different products and their ratings in these neighborhoods. The average rating for each product in each neighborhood may be computed and used as the predicted rating. In small data sets, local neighborhoods may not have many subjects and it may be the case that a specific product will not be rated in this neighborhood. Advantageously, the operations described herein may be used to create a generalization based on the insight that products may share characteristics with each other (e.g., are related to each other).

In one embodiment, a score for each possible product the user might like may be computed based on a weighted average of the products of the neighbors. In one embodiment, this weight depends on the similarity of the product to be predicted to the neighboring product. This may allow for an estimation of how much a user might like a new product even if no one in their immediate neighborhood has tried that exact product.

For example, there may be space for all products that are available to recommend to consumers. There may also be products used by people in a neighborhood defined as those people that score similarly on our consumer attributes (demographics, similarity in furnishing styles, etc.). A similarity matrix between products may be constructed to allow for the estimation of the rating of products that are not in the neighborhood based on their similarity to products that are in the neighborhood. Offline estimation may be performed by a panel of human subjects who rate the similarity of product pairs, or it could be done based on insight into the similarity of composition of the products.

The recommender may provide product predictions for specific users. In one embodiment, collecting more data may improve rating accuracy. In another embodiment, the recommender model chosen relies on a k-nearest neighbor estimator. Such models may be sensitive to the inclusion of irrelevant attributes. In one embodiment, instead of or in combination with weighting each attribute the same in comparisons of neighbors, a weight proportional to the importance of the attribute may be used. In one example a consumer's style related attributes may be weighted more heavily than other attributes, such as income. In one embodiment, such weights may come from the logistic regression determinations described above. In another embodiment, supervised automatic relevance determination (ARD) techniques may be used to tune the weights in the nearest neighbor classifier. By using the most relevant attributes in proportion to their importance, predictions may be improved.

Figure 5:
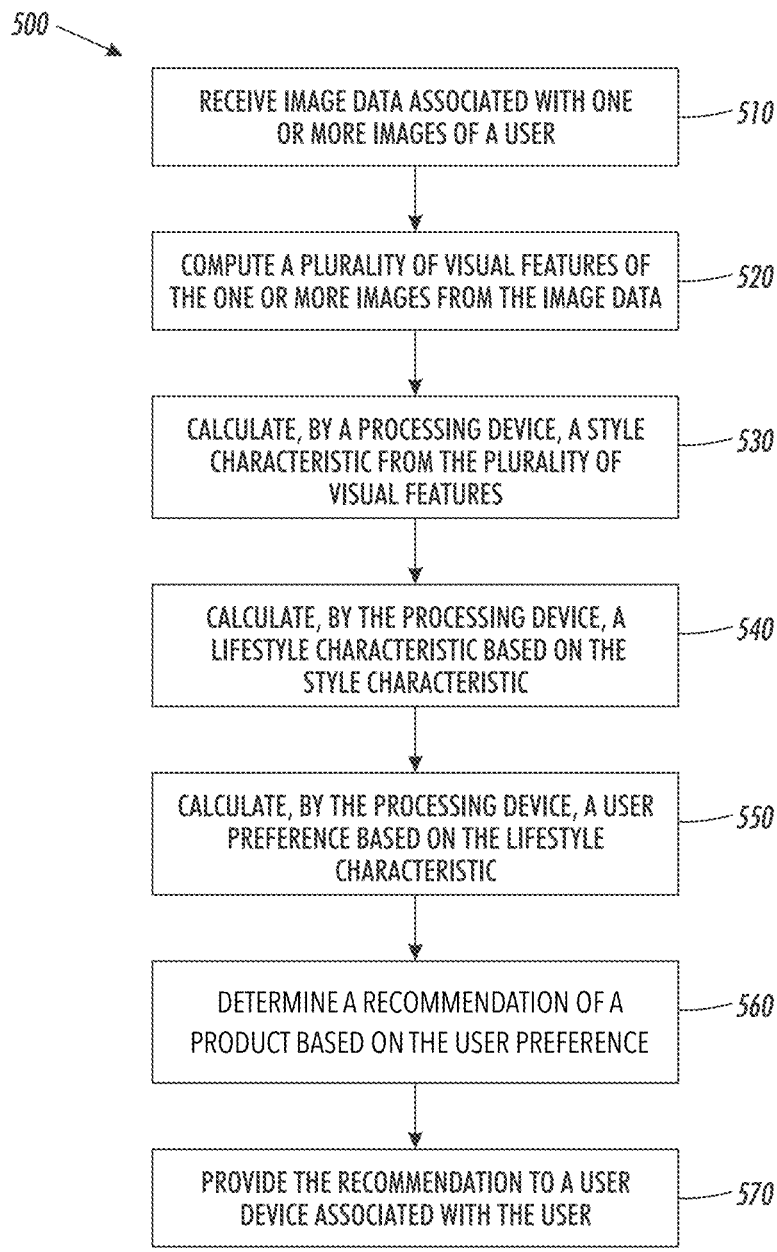
FIG. 5 is a flow diagram of an embodiment of a method of inferring user lifestyle and preference information from images in accordance with some embodiments.

FIG. 5 is a flow diagram 500 of an embodiment of a method of inferring user lifestyle and preference information from images in accordance with some embodiments. For example, the processes described with reference to FIG. 5 may be performed by processing logic of a recommendation system 100 as described with reference to FIG. 1.

Beginning in block 510, processing logic may receive image data associated with one or more images of a user. The image data may be the logical representation of the one or more images. In one embodiment, two images are received by processing logic, where each image is of (depicts, shows, etc.) a different interior room associated with a user. In another embodiment, a single image or multiple images of the same interior room is/are received.

At block, 520, processing logic computes a plurality of visual features of the one or more images from the image data. In one embodiment, visual features of the one or more images may be visible objects in the one or more images. Various types of visual features may be computed from the indoor image data, such as GIST, Local Binary Pattern (LBP), Hierarchical features through a neural networks etc. to capture and identify the visual information from the indoor images. For example, furniture, pets, cars, food, electronics, paint colors, floor styles, etc. may be visual features computed by the processing logic. The processing logic may utilize computer vision, object recognition, machine learning, and other techniques to compute the visual features. In one embodiment, it the number of computed visual features is below a defined threshold, an error message indicating that the image may not be used may be sent to a computing device (e.g., a computing device associated with an uploading user). In another embodiment, low-level features such as oriented edges, color histograms, SIFT, SURF, HOG, LBP and other traditional computer vision features.

At block 530 processing logic calculates a style characteristic from the plurality of visual features computed at block 520. The style characteristic (also referred to herein as an indoor style of a mid-level representation) may include a style of room, as described above. Processing logic may calculate a lifestyle characteristic (also referred to herein as a sentiment of a mid-level representation) based on the style characteristic at block 540.

It should be mentioned that the number of steps in this pipeline could be application dependent. In some cases processing logic might go directly from computer vision level features (e.g., 520) to product preferences (e.g., 560) based on the idea that preferences for bright bold interior design might be correlated with bright bold products. Processing logic can directly learn this model. In other embodiments, it may be convenient to execute more steps in the pipeline to take advantage of abstractions. Processing logic may recognize pet or children related features and add these high level abstractions to the profile and use these to predict product, or recognize specific furnishing styles such as country, retro or industrial and use these high level abstractions to predict products. Processing logic may introduce another level related to personality characteristics.

At block 550, processing logic may calculate a user preference based on the lifestyle characteristic (e.g., and the style characteristic). Processing logic may then determine a recommendation of a product based on the user preference (block 260) and provide the recommendation to a user device associated with the user (block 570). In one embodiment, the recommendation may be based on past user feedback, similarity characteristics between various products, or similarity characteristics between demographic characteristics of multiple users.

In one embodiment, processing logic may adjust a setting associated with a networked device based on the recommendation. For example, processing logic may send an instruction to a networked device to adjust an output or other characteristic (e.g., via a heating element) based on the recommendation.

Figure 6:
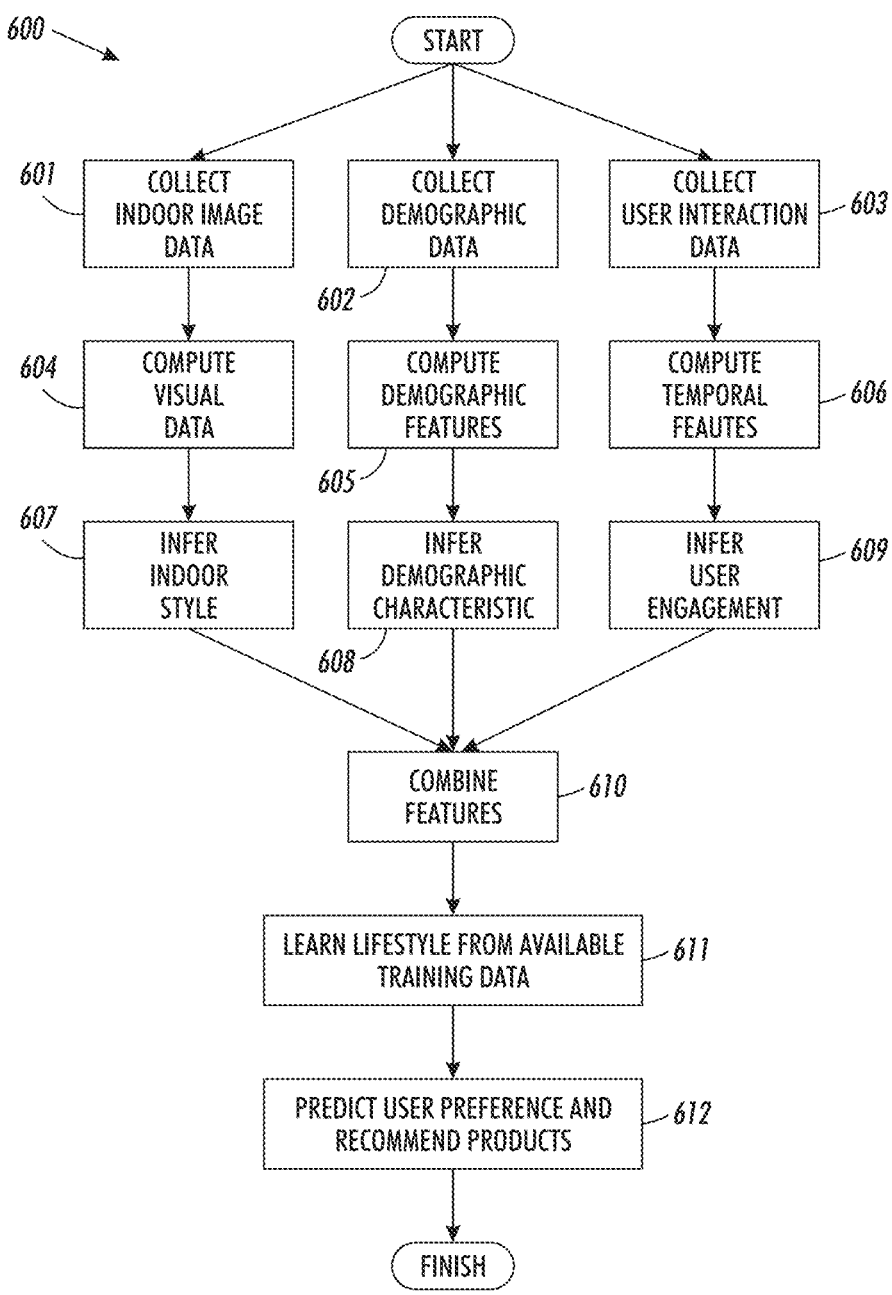
FIG. 6 is a flow diagram of an embodiment of a method of inferring user lifestyle and preference information from images in accordance with some embodiments.

FIG. 6 is a flow diagram 600 of an embodiment of a method of inferring user lifestyle and preference information from images in accordance with some embodiments. For example, the processes described with reference to FIG. 6 may be performed by processing logic of a recommendation system 100 as described with reference to FIG. 1. The operations of FIG. 6 may include and elaborate on some of the operations described with respect to FIG. 5.

At blocks 601, 602, and 603, processing logic collects (e.g., receives) data. At block 601, processing logic collects indoor image data. In one embodiment, images of multiple rooms from various users may be received. For example, the images may represent a kitchen, living room, dining room etc. At block 602, processing logic collects demographic data. In one embodiment, demographic data may be generated based on a survey. Demographic data may include user (e.g., consumer) details such as age, sex, location, educational background, job specification, economic standard, number of kids or pets they have etc. At block 603, processing logic collects user interaction data. In one embodiment, user interaction data may include data associated with a user's interaction with given devices. In one embodiment, measurements from installed sensors integrated in a smart home environment such as those from smart (networked) thermostats may be collected. Such sensors may provide data regarding temperature, humidity etc.

Processing logic at blocks 604, 605, and 606 computes features. At block 604, processing logic computes visual features. Various types of visual features may be computed from the indoor image data, such as GIST, Local Binary Pattern (LBP), Hierarchical features through a neural networks etc. to capture and identify the visual information from the indoor images. At block 605, processing logic computes demographic features. In one embodiment, to compute demographic features, processing logic may filter noise from the survey data and featurize the survey data using one-hot encoding. At block 606, processing logic computes temporal features. In one embodiment, to account for user interaction, processing logic may compute temporal features such as frequency of device usage, duration of the use, cycle of using the device, etc. Processing logic may filter the noise from log data to increase robustness in the measurement. Processing logic may compute correlation between different sensor outputs (e.g., temperature and humidity) to identify meaningful patterns.

Processing logic at blocks 607, 608, and 609 determines a mid-level representation based on the features computed at 604-606. At block 607, processing logic determines an indoor style. In one embodiment, for a given image, processing logic determines the indoor style. Indoor styles include but are not limited to: modern, classical, country, contemporary, and industrial. Processing logic may utilize machine learning models such as SVM, random forest, deep neural network for determining the style from the image. In one embodiment, processing logic may manually generate style labels to train the models.

At block 608, processing logic determines demographic characteristics. In one embodiment, processing logic discovers informative demographic features for making a prediction/recommendation of user preference. At block 609, processing logic may determine user engagement. In one embodiment, based on the temporal features about user interaction, processing logic may determine the level of engagement of each user. In one embodiment, a rule based framework may be used to determine the level of interaction from the features. For example, recognizing that a user has only ever used one product and is growing bored of this experience could allow processing logic to suggest additional products for everyday use or special products for holiday occasions. Worth noting is that this is a different kind of recommendation. It is not based on absolute preferences, but on the meta-preference for variety. In another embodiment, engagement might be used to determine the time of day that products are used and processing logic might use correlations between morning activity, which might be a better time for stimulating products, and evening activity, which might be a better time for relaxing products.

At block 610, processing logic combines the features. In one embodiment, processing logic combines feature from three modalities: visual features, demographic features, temporal interaction features for further processing. At block 611, processing logic determines a lifestyle from available training data. In one embodiment, processing logic has access to training data in terms of user feedback about the products they have used during a survey. For example, consider a smart product dispenser which is controlled through an app installed in smart phones. Processing logic may gather user feedback in terms of simplicity of installing the device, simplicity of using the device, level of satisfaction, rating of the device and the app, preference of product etc. Processing logic may use machine learning models to learn user lifestyles based on the data, such as what type of décor is suitable for a demography class and how lifestyle and demographic background is related to preference of consumer products.

In one embodiment, the operations described with respect to block 611 may be included in a separate pipeline. One pipeline may collect data from surveys or app usage to provide a target variable such as satisfaction, likelihood to recommend, etc. A separate pipeline may collect sensor data and then train the model. Once the model is trained, it is fed to the prediction procedure. In this example two pipelines may exist: 1) the offline learning pipeline, which builds prediction models and 2) the online recommendation process, which accepts the model parameters and uses them to convert observed data into recommendations At block 612, processing logic predicts a user preference. In one embodiment, when processing logic has identified the lifestyle, processing logic may predict products that match the lifestyle. Processing logic may use collaborative filtering to recommend products to users. In one embodiment, users' past feedback to products, similarity between various products, and similarity between users in term of their demographic characteristics may be utilized to make the recommendation.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 7:
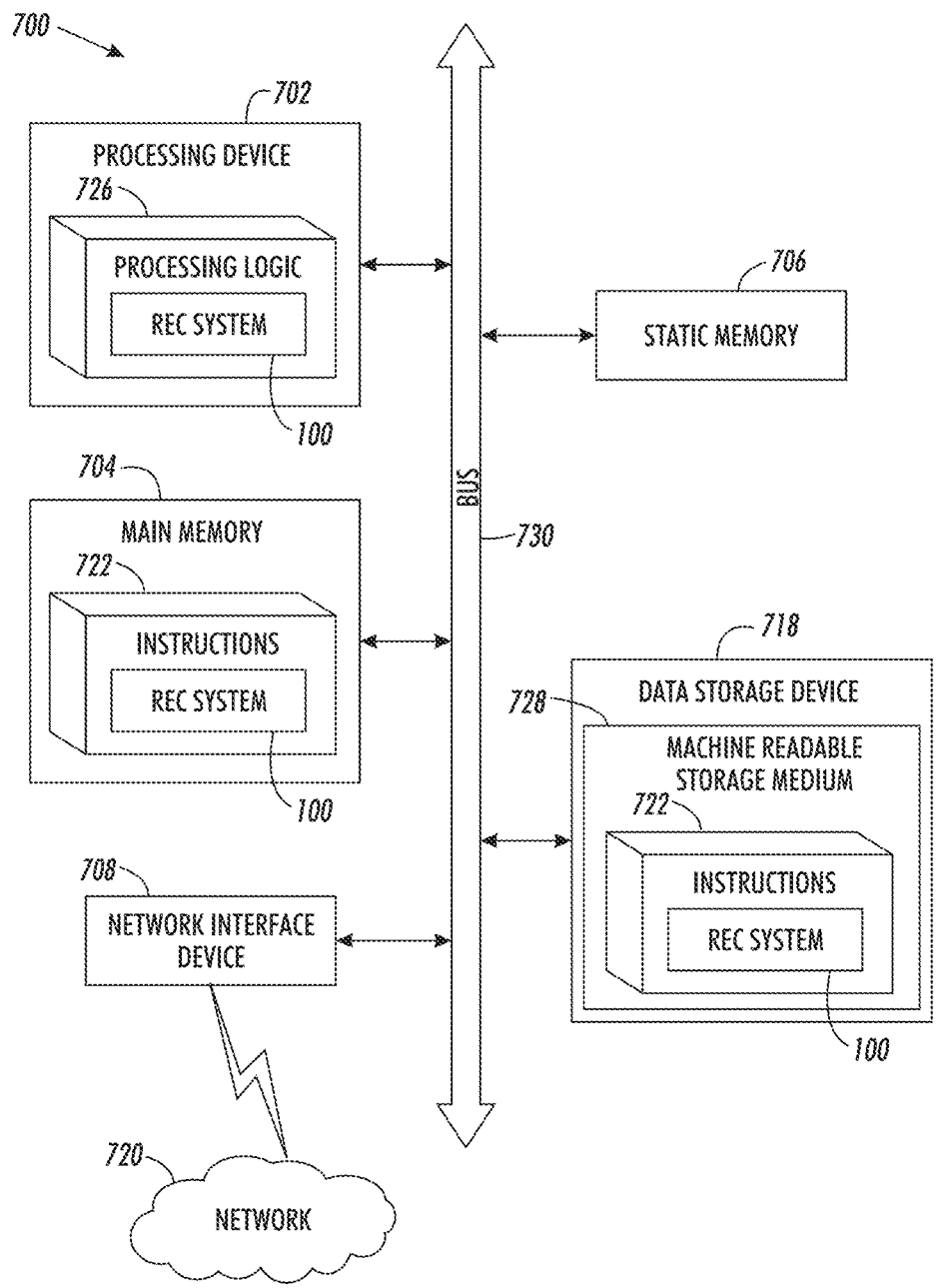
FIG. 7 is an illustration showing an example computing device which may implement the embodiments described herein.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server computer system, such as recommendation (rec) system 100 configured to analyze log data of networked devices.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of system 100 shown in FIG. 1, for performing the operations and steps discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute recommendation system 100. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform the methods and operations described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method of determining and providing a recommendation of a product, the method comprising:
   receiving image data associated with one or more images of a user, demographic data of the user, and user interaction data of the user;
   computing a plurality of visual features of the one or more images from the image data;
   determining, by a processing device, a style characteristic of the one or more images of the user based on the plurality of visual features using a first machine learning model;
   determining, by the processing device, a demographic characteristic based on the demographic data of the user and determining a user engagement parameter based on the user interaction data of the user, wherein the demographic characteristic is generated by using one-hot encoding and applying a noise filter to survey data to generate a filtered set of demographic data;
   combining, by the processing device, the style characteristic, the demographic characteristic, and the user engagement parameter to generate a combined feature set;
   training a second machine learning model using training data received from an initial model, the training data comprising demographic information, visual image feature information, and user feedback information of a plurality of other users, the second machine learning model mapping the combined feature set to one or more user preferences;
   determining, using the second machine learning model, a recommendation of a product based on the one or more user preferences;
   providing the recommendation to a user device associated with the user;
   updating the training data based on at least one of the received image data, the demographic data of the user, or the user interaction data of the user; and
   updating the second machine learning model using the updated training data.

2. The method of claim 1, further comprising adjusting a setting associated with a networked device based on the recommendation.

3. The method of claim 1, wherein a first image and a second image of the one or more images are associated with different interior rooms, respectively.

4. The method of claim 1, wherein determining the recommendation comprises comparing the one or more user preferences to the demographic information or the visual image feature information.

5. The method of claim 1, wherein determining the demographic characteristic comprises:
   computing a plurality of demographic features from the demographic data of the user, wherein each of the plurality of demographic features are informative for predicting a user preference; and
   determining the demographic characteristic from the plurality of demographic features.

6. The method of claim 5, wherein determining the user engagement parameter comprises:
   computing a plurality of temporal features from the user interaction data of the user, wherein the plurality of temporal features indicates a level of interaction of the user with one or more products; and
   determining the user engagement parameter from the plurality of temporal features.

7. The method of claim 5, wherein the demographic data of the user is associated with at least one of an age, sex, location, educational background, job specification, economic standard, or number of kids or pets of the user.

8. The method of claim 6, wherein the user interaction data of the user is associated with an interaction of the user with the networked device.

9. A product recommendation system comprising:
   a memory; and
   a processing device, operatively coupled to the memory, the processing device to:
   receive image data associated with one or more images of a user, demographic data of the user, and user interaction data of the user;
   compute a plurality of visual features of the one or more images from the image data;
   determine a style characteristic of the one or more images based on the plurality of visual features using a first machine learning model;
   determine a demographic characteristic based on the demographic data of the user and determine a user engagement parameter based on the user interaction data of the user, wherein the demographic characteristic is generated by using one-hot encoding and applying a noise filter to survey data to generate a filtered set of demographic data;
   combine the style characteristic, the demographic characteristic, and the user engagement parameter to generate a combined feature set;
   train a second machine learning model using training data received from an initial model, the training data comprising demographic information, visual image feature information, and user feedback information of a plurality of other users, the second machine learning model mapping the combined feature set to one or more user preferences; determine, using the second machine learning model, a recommendation of a product based on the one or more user preferences; and
   provide the recommendation to a user device associated with the user;
   update the training data based on at least one of the received image data, the demographic data of the user, or the user interaction data of the user; and
   update the second machine learning model using the updated training data.

10. The product recommendation system of claim 9, wherein to determine the recommendation the processing device is further to compare the one or more user preferences to at least one of: the demographic information, the visual image feature information, and the user feedback information of the plurality of other users.

11. The product recommendation system of claim 9, the processing device further to:

compute a plurality of demographic features from the demographic data of the user, wherein each of the plurality of demographic features are informative for predicting a user preference; and determine the demographic characteristic from the plurality of demographic features.

12. The product recommendation system of claim 9, wherein the processing device is further to:

compute a plurality of temporal features from the user interaction data of the user, wherein the plurality of temporal features indicates a level of interaction of the user with one or more products; and determine the user engagement parameter from the plurality of temporal features.

13. The product recommendation system of claim 12, wherein the user interaction data of the user is associated with an interaction of the user with a networked device.

14. A non-transitory computer-readable storage medium having instructions stored thereon that, when executed by a processing device, cause the processing device to:

receive image data associated with one or more images of a user, demographic data of the user, and user interaction data of the user;

compute a plurality of visual features of the one or more images from the image data;

determine a style characteristic of the one or more images based on the plurality of visual features using a first machine learning model;

determine a demographic characteristic based on the demographic data of the user and determine a user engagement parameter based on the user interaction data of the user, wherein the demographic characteristic is generated by using one-hot encoding and applying a noise filter to survey data to generate a filtered set of demographic data;

combine the style characteristic, the demographic characteristic, and the user engagement parameter to generate a combined feature set;

train a second machine learning model using training data received from an initial model, the training data comprising demographic information, visual image feature information, and user feedback information of a plurality of other users, the second machine learning model mapping the combined feature set to one or more user preferences; determine, using the second machine learning model, a recommendation of a product based on the one or more user preferences; and provide the recommendation to a user device associated with the user;

update the training data based on at least one of the received image data, the demographic data of the user, or the user interaction data of the user; and update the second machine learning model using the updated training data.

15. The non-transitory computer-readable storage medium of claim 14, wherein the product is a scent associated with a networked device.

16. The non-transitory computer-readable storage medium of claim 15, wherein to determine the recommendation the processing device is further to compare the one or more user preferences to at least one of: the demographic information, the visual image feature information, and the user feedback information of the plurality of other users.

* * * * *